Patented Apr. 25, 1933

1,906,068

UNITED STATES PATENT OFFICE

JOSEPH ADAM JENEMANN, OF PHILADELPHIA, PENNSYLVANIA, ASSIGNOR TO THE GRASSELLI CHEMICAL COMPANY, OF CLEVELAND, OHIO, A CORPORATION OF DELAWARE

LACTIC ACID

Application filed March 2, 1931. Serial No. 519,353.

The present invention relates to processes of recovering purified lactic acid from aqueous solutions of technical lactic acid.

Technical aqueous solutions of lactic acid as obtained in fermentation processes contain various inorganic and organic impurities, as for instance, calcium sulfate and other salts, volatile matters, unfermentable sugars, dark coloring matters, etc. Lactic acid can be used in this crude form in many technical processes, but separation from the impurities is required whenever the lactic acid is intended for edible purposes. Processes wherein ethyl ether, in which lactic acid is easily soluble, are used to extract the lactic acid and the acid recovered by distillation of the solvent, are commonly used to produce a purified lactic acid.

I have found that lactic acid has a solubility in isopropyl ether which makes this solvent particularly adapted for use in recovering pure lactic acid solutions from its impure aqueous solutions and my invention relates to a cyclic process of extracting lactic acid from its aqueous solution with isopropyl ether and recovering pure aqueous solutions of lactic acid from the original isopropyl ether solutions.

In its broadest embodiment the process of my invention consists in contacting an impure aqueous solution of lactic acid with isopropyl ether, separating the extracted aqueous solution from the isopropyl ether solution, contacting the latter with water, separating the so formed aqueous lactic acid solution from the spent isopropyl ether and returning the latter to the extraction of impure aqueous lactic acid.

Figure 1:
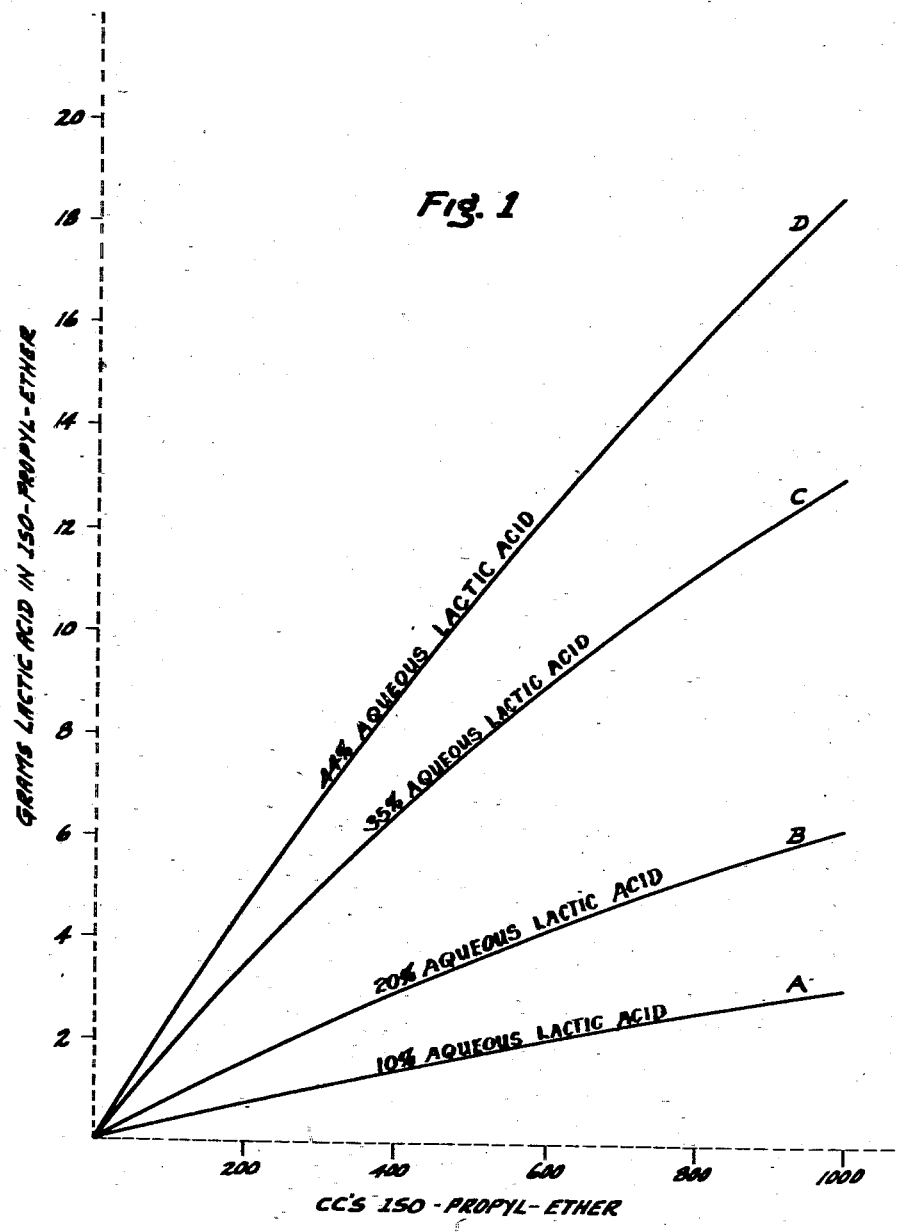

The attached Fig. 1 shows curves of the distribution of lactic acid between water and isopropyl ether under various conditions.

Figure 2:
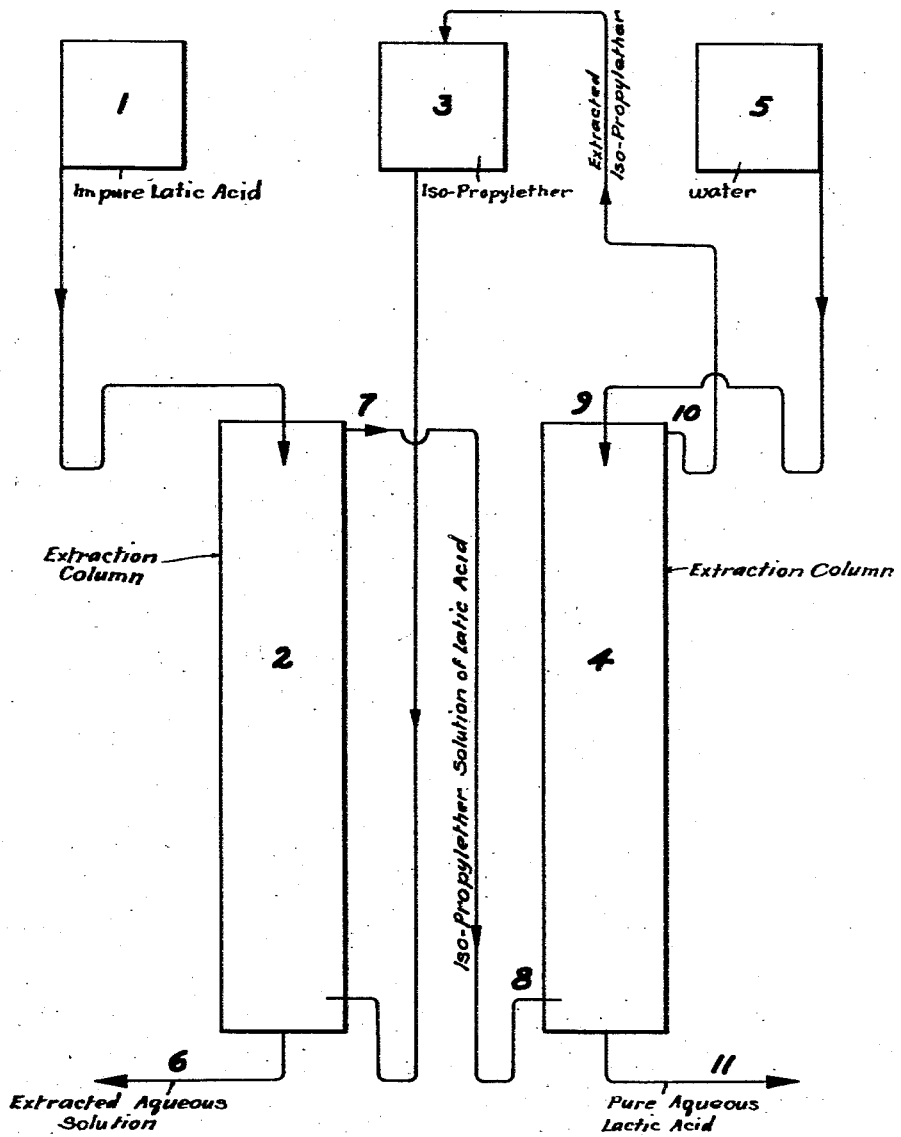

Fig. 2 shows in a diagrammatical manner a flow sheet of the process of my invention and apparatus used therein.

The curves of Fig. 1 represent the distribution of lactic acid between water and isopropyl ether when 100 cc.'s of aqueous lactic acid solutions of different strengths are mixed with a given number of cc.'s of isopropyl ether. The abscissa indicates the number of cc.'s isopropyl ether mixed with the aqueous lactic acid and the ordinate gives the number of grams of 100% lactic acid contained in the isopropyl ether. Curve A applies to a 10% aqueous lactic acid by weight, B to a 20%, C to a 35% and D to a 44% lactic acid. It was, for instance, found that in mixing 100 cc.'s of a 44% by weight aqueous lactic acid with 100 cc.'s of isopropyl ether, 2.3 grams of lactic acid was dissolved by the isopropyl ether and in using 1000 cc.'s isopropyl ether 18.4 grams lactic acid was extracted by the solvent.

The corresponding figures for a 10% lactic acid were 0.4 and 3.0 grams respectively.

These curves have been drawn from figures obtained at room temperature on a large number of extraction experiments.

As far as my experience goes, the solubility of lactic acid is not materially influenced by the impurities contained in aqueous lactic acid solutions obtained from fermentation processes and the figures are substantially the same when mixing pure or crude aqueous lactic acid solutions with isopropyl ether.

It is evidenced from these curves that the distribution co-efficient of lactic acid, between water and isopropyl ether favors the solution in water. It is therefore advisable to use large volumes of the solvent and extract the lactic acid from its concentrated solutions as are obtained by evaporation of fermentation liquors. For practical purposes and efficient operation at least 5, and preferably more than 10 volumes of isopropyl ether should be used for each volume of concentrated lactic acid.

When extracting one volume of a 44% by weight aqueous lactic acid with 50 volumes isopropyl ether it will be found that 85% of the total lactic acid has been dissolved by the isopropyl ether, whereas on mixing equal volumes of a 44% aqueous lactic acid and isopropyl ether only about 5% of the acid is taken up by the isopropyl ether. While this relatively low solubility may at first appear detrimental to the use of isopropyl ether as an extraction agent for lactic acid, it is of advantage in my process in which in a subsequent step I take out the lactic acid from the isopropyl ether solution with water where I require a lesser amount of water, and thereby obtain a final, more concentrated solution.

It is, of course, in both extraction steps of my process unnecessary to use extremely large volumes of solvent and water. It is preferable to proceed in a systematic countercurrent manner in which the solvent or water respectively comes in contact first with the nearly completely extracted solution.

Besides its favorable dissolving properties for lactic acid, isopropyl ether has a number of other advantages over other solvents used heretofor in the extraction of lactic acid from its aqueous solutions. It was found that water is soluble in isopropyl ether at 25° C. to the extent of 0.025% by volume, which is considerably less than the solubility of water in ethyl ether. On the other hand, the solubility of isopropyl ether in water is again very small, of the order of about ½ volume per cent at 25° C. and these properties prevent the unavoidable losses of solvent incurred with the use of ethyl ether. Still another advantage of isopropyl ether for use in extraction of lactic acid is its boiling point of 67-68° C., which minimizes any possible losses by evaporation. Possibly the main advantage of isopropyl ether is, however, its lack of dissolving properties for the common impurities contained in fermentation lactic acid.

In its preferred form my lactic acid extraction process comprises first systematically extracting the lactic acid from its impure, concentrated aqueous solutions with isopropyl ether, separating the two solutions and re-extracting in a systematic manner the lactic acid contained in the isopropyl ether with water. The spent isopropyl ether is then again used to extract subsequent portions of impure lactic acid.

This lactic acid process can be carried out in various forms of equipment adapted to circulate and mix liquids of different specific gravity. I have shown in the flow sheet of Fig. 2 a diagrammatical sketch of an equipment which I found particularly suited for the performance of my process.

No. 1, in this figure, is a storage tank for crude aqueous lactic acid, 2 is an extraction column of conventional form, equipped with perforated plate partitions and overflows, in which are formed a number of pools of aqueous solution; 3 is a storage tank for isopropyl ether, 4 is another extraction column similar in design to No. 2, 5 is a supply for water. The crude lactic acid runs from tank 1 into top of column 2. The isopropyl ether runs from tank 3 into the bottom of column 2, and ascends therein due to its specific gravity being less than that of water. It contacts in the various pools with aqueous lactic acid of increasing concentration. The extracted aqueous solution leaves the column at the bottom at 6.

The isopropyl ether solution of lactic acid formed leaves the column at its top, at 7 and enters the second column, 4, at the bottom at 8. Fresh water is fed into this column at the top, 9, the isopropyl ether solution ascending in 4 meets water in the different pools and gradually gives up its lactic acid content, forming thereby aqueous lactic acid solutions of downwardly increasing strength. The extracted isopropyl ether leaves column 4 at its top at 11 and is returned by any suitable mechanical means to reservoir 3. The pure aqueous lactic acid solution leaves column 4 at its bottom, at 11 and is ready for use or further concentration as desired.

It will be seen that operating in this manner dispenses entirely with heating or distilling non-aqueous solutions of lactic acid, which is always accompanied with formation of lactone or other decompositions.

The following is a description of how I performed my novel process in connection with the apparatus sketched above:

I have taken a commercial lactic acid obtained through usual treatments of fermentation liquors and concentrated it to contain 44% lactic acid by weight. This was run into the top of column 2, containing a series of 6 partitions. At the same time I ran 16 volumes of isopropyl ether for each volume of concentrated lactic acid into the bottom of the same column. The aqueous liquor discharged from the bottom of this column contained substantially all the impurities of the original aqueous solution, together with about 20% of the total lactic acid charged. This acid contains some impurities in such concentrations that they can be removed by well known methods and the acid thereby made available for certain technical uses where a colored, impure acid is suitable.

The isopropyl ether solution discharged at the top of the column contained about 2% by weight of lactic acid. It was substantially free from inorganic salts, residual sugars and the coloring matters present in the original aqueous solution used.

This solution was then run into the bottom of column 4, where it met through its various pools a stream of water introduced through the top in the ratio of 1 volume water for each 25 volumes of isopropyl ether solution. The aqueous lactic acid obtained at the bottom of column 4 contained 35% lactic acid. It had a slight amber color and after boiling off the small amounts of isopropyl ether dissolved it was suitable for all edible purposes.

The spent isopropyl ether was returned to reservoir 3.

The quantities of isopropyl ether and fresh water used in the two extraction steps of my process can, of course, be varied within wide limits and depend entirely upon economical considerations. Edible lactic acid is used in the arts to a considerably lesser extent than technical acid; it is therefore in many instances sufficient to extract only a fraction of the lactic acid contained in fermentation liquors, in which case relatively small amounts, such as 5 or 6 volumes only, of isopropyl ether will be used in my extraction process. On the other hand, the concentration of the final aqueous, pure lactic acid will depend upon the amount of water used in the second extraction step and can therefore be varied as desired. It will be well understood that the lactic acid remaining in the spent isopropyl ether from the second extracting step is not lost, as it merely circulates between the two extractions.

While I have disclosed a column type apparatus for performing the extraction of lactic acid with isopropyl ether, it should be understood that my invention is not limited to this type of apparatus, but that other well known equipments, such as a battery of tanks, suitable for mixing and contacting liquids of different specific gravity or for systematic counter-current extraction, may be convenient and efficient in the performance of my invention.

I claim:

1. The process of making purified lactic acid which comprises the steps of contacting technical aqueous lactic acid with isopropyl ether, separating the isopropyl ether lactic acid solution formed from the aqueous layer, contacting said isopropyl ether lactic acid solution with fresh water and separating the aqueous solution of purified lactic acid from the extracted isopropyl ether.

2. The process of making a purified lactic acid which comprises the steps of contacting technical aqueous lactic acid with isopropyl ether, separating the isopropyl ether lactic acid solution formed from the aqueous layer, contacting said isopropyl ether lactic acid solution with fresh water, separating the aqueous solution of purified lactic acid from the extracted isopropyl ether and returning said extracted isopropyl ether to the extraction of impure, aqueous lactic acid.

3. The process of making purified lactic acid which comprises the steps of running in counter-current a technical aqueous solution of lactic acid and isopropyl ether through an extraction apparatus, separating the isopropyl ether lactic acid solution formed the aqueous layer, running said isopropyl ether lactic acid solution and fresh water in counter-current through an extraction apparatus and separating the aqueous solution of purified lactic acid formed from the extracted isopropyl ether.

4. The process of making purified lactic acid which comprises the steps of contacting impure, aqueous lactic acid obtained by fermentation processes with isopropyl ether, separating the isopropyl ether lactic acid solution formed from the aqueous layer, contacting said isopropyl ether lactic acid solution with fresh water and separating the aqueous solution of purified lactic acid from the extracted isopropyl ether.

5. The process of making a purified lactic acid which comprises the steps of contacting impure, aqueous lactic acid obtained by fermentation processes with isopropyl ether, separating the isopropyl ether lactic acid solution formed from the aqueous layer, contacting said isopropyl ether lactic acid solution with fresh water, separating the aqueous solution of purified lactic acid from the extracted isopropyl ether and returning said extracted isopropyl ether to the extraction of impure, aqueous lactic acid.

6. The process of making purified lactic acid which comprises the steps of running in counter-current an impure aqueous solution of lactic acid obtained by fermentation processes and isopropyl ether through an extraction apparatus, separating the isopropyl ether lactic acid solution formed from the aqueous layer, running said isopropyl ether lactic acid solution and fresh water in counter-current through an extraction apparatus and separating the aqueous solution of purified lactic acid formed from the extracted isopropyl ether.

7. The process of making purified lactic acid which comprises extracting concentrated aqueous lactic acid obtained by fermentation processes with several times its volume of isopropyl ether and reextracting the dissolved lactic acid therefrom with fresh water in an amount representing a fraction of the volume of the isopropyl ether used.

8. The process of making purified lactic acid which comprises the steps of contacting isopropyl ether with an aqueous lactic acid which contains impurities which are more easily soluble in water than in isopropyl ether, separating the solution of lactic acid in isopropyl ether formed from the aqueous layer, contacting said solution of lactic acid in isopropyl ether with fresh water and separating the aqueous solution of purified lactic acid from the extracted isopropyl ether.

In testimony whereof, I affix my signature.

JOSEPH ADAM JENEMANN.

CERTIFICATE OF CORRECTION.

Patent No. 1,906,068.  April 25, 1933.

JOSEPH ADAM JENEMANN.

It is hereby certified that error appears in the printed specification of the above numbered patent requiring correction as follows: Page 3, line 65, claim 3, after "formed" insert the word "from"; and that the said Letters Patent should be read with this correction therein that the same may conform to the record of the case in the Patent Office.

Signed and sealed this 6th day of June, A. D. 1933.

M. J. Moore.

(Seal)  Acting Commissioner of Patents.